US012719174B2

(12) United States Patent
Rabbani et al.

(10) Patent No.: US 12,719,174 B2
(45) Date of Patent: Aug. 25, 2026

(54) METAMATERIAL-ENABLED BEAM SCANNING ANTENNA

(71) Applicant: THE UNIVERSITY OF BIRMINGHAM, Birmingham (GB)

(72) Inventors: Muhammad S Rabbani, Birmingham (GB); James Churm, Birmingham (GB); Alexandros Feresidis, Birmingham (GB)

(73) Assignee: THE UNIVERSITY OF BIRMINGHAM, Birmingham (GB)

( * ) Notice: Subject to any disclaimer, the term of this patent is extended or adjusted under 35 U.S.C. 154(b) by 0 days.

(21) Appl. No.: 18/848,033

(22) PCT Filed: Mar. 7, 2023

(86) PCT No.: PCT/GB2023/050528
§ 371 (c)(1),
(2) Date: Sep. 17, 2024

(87) PCT Pub. No.: WO2023/175303
PCT Pub. Date: Sep. 21, 2023

(65) Prior Publication Data

US 2025/0210876 A1 Jun. 26, 2025

(30) Foreign Application Priority Data

Mar. 18, 2022 (GB) ...................................... 2203793

(51) Int. Cl.
*H01Q 15/00* (2006.01)
*H01Q 13/28* (2006.01)

(52) U.S. Cl.
CPC ......... *H01Q 15/0026* (2013.01); *H01Q 13/28* (2013.01); *H01Q 15/006* (2013.01); *H01Q 15/0086* (2013.01)

(58) Field of Classification Search
CPC .... H01Q 3/16; H01Q 21/0006; H01Q 15/002; H01Q 15/0026; H01Q 15/0086; H01Q 13/20
See application file for complete search history.

(56) References Cited

U.S. PATENT DOCUMENTS 10,128,931 B2 11/2018 Rothaar et al.
11,217,890 B2 1/2022 Linn et al.
(Continued)

FOREIGN PATENT DOCUMENTS

CN 111682317 A 9/2020
CN 114069232 A 2/2022
(Continued)

OTHER PUBLICATIONS

Ji et al. (2015). A reconfigurable partially reflective surface (PRS) antenna for beam steering. IEEE Transactions on Antennas and Propagation, 63(6), 2387-2395.
(Continued)

*Primary Examiner* — Dimary S Lopez Cruz
*Assistant Examiner* — Anna N Hamadyk
(74) *Attorney, Agent, or Firm* — Caesar Rivise, PC

(57) ABSTRACT

There is disclosed a leaky-wave antenna device comprising a first metasurface comprising a first dielectric substrate having a first array of conductive elements and a second metasurface comprising a second dielectric substrate having a second array of conductive elements. The antenna device further comprises a conductive ground plane, a micro-actuator, and a feed comprising a pair of switchable dipoles. The first and second metasurfaces and the conductive ground plane are in a stacked arrangement and substantially parallel to one another, with the first metasurface located between the second metasurface and the conductive ground plane. A spacing between the conductive ground plane and
(Continued)

the first metasurface is adjustable by operation of the micro-actuator. The feed is disposed between the first and second metasurfaces at a location corresponding to a centre of the first and second arrays. The leaky-wave antenna device may be operated to steer a beam over a wide range by selective energising of the pair of dipoles and by adjusting the spacing between the conductive ground plane and the first metasurface.

18 Claims, 10 Drawing Sheets

(56) References Cited

U.S. PATENT DOCUMENTS

2010/0289717 A1* 11/2010 Arslan .................. H01Q 23/00 343/876
2011/0241972 A1* 10/2011 Wansch ................ H01Q 13/20 343/893
2020/0203853 A1* 6/2020 Hu .......................... H01Q 3/24

FOREIGN PATENT DOCUMENTS

TW 201933680 A 8/2019
TW I732905 B 7/2021
WO 2015126550 A1 8/2015

OTHER PUBLICATIONS

Rabbani et al. (2021) Electro-mechanically tunable meta-surfaces for beam-steered antennas from mm-Wave to THz. In 2020 50th European Microwave Conference (EuMC) (pp. 416-419). IEEE.
International Search Report from corresponding PCT/GB2023/050528 mailed Jun. 23, 2023.
English abstract for CN 111682317 A (2020).
English abstract for CN 114069232 A (2022).
Search Report from counterpart GB Patent Application No. 2203793.1 mailed Sep. 9, 2022.

* cited by examiner

METAMATERIAL-ENABLED BEAM SCANNING ANTENNA

CROSS-REFERENCE TO RELATED APPLICATIONS

This application is a U.S. National Phase Application of PCT/GB2023/050528, filed Mar. 7, 2023, which claims priority to GB 2203793.1, filed Mar. 18, 2022, the contents of which applications are incorporated herein by reference in their entireties for all purposes.

FIELD OF THE INVENTION

This invention relates to an antenna in which metamaterial surfaces are controllably displaced relative to a ground plane so as to introduce a phase shift and thereby to enable beam steering.

BACKGROUND

It is expected that beam steerable, high gain antennas, operating in millimetre wave (mm-wave) band frequencies (e.g. 30 to 300 GHz), will play a key role in several wireless applications, including 5G and beyond, especially to sustain the wireless link in a dynamic environment. However, antenna beam steering at these high frequencies is challenging, since conventional phased array and beam switching techniques are limited by several factors, including loss performance and availability of off-the-shelf components.

Earlier work by the present inventors (Rabbani, Churm & Feresidis; "Electro-Mechanically Tunable Meta-Surfaces for Beam-Steered Antennas from mm-Wave to THz"; Proceedings of the 50th European Microwave Conference; 12-14 Jan. 2021; Utrecht; pp 416 to 419; the full disclosure of which is hereby incorporated by reference) has resulted in the development of a leaky-wave antenna (LWA) employing extremely low loss tuneable metasurfaces as a phase shifting material in order to obtain beam steering capabilities.

An LWA is a type of travelling wave antenna, to be distinguished from a more conventional resonant antenna, such as a monopole or dipole. In an LWA, the radio frequency (RF) current that generates the transmitted radio signal travels along the antenna in one direction. This is in contrast to a resonant antenna, where RF currents travel in both directions along the antenna, bouncing between the ends. The travelling wave in an LWA is typically a fast wave, with a phase velocity greater than the speed of light.

A metasurface, in the context of the present application, is a thin sheet of material (of thickness less than the wavelength of the RF signals modulated by the metasurface) having a periodic array of scattering elements whose dimensions and periods are small compared with the operating wavelength. A typical metasurface may comprise a thin dielectric substrate of thickness <1 mm with a two dimensional array of conductive metal elements printed or etched on the substrate, the conductive elements having a size of the order of millimetres.

The earlier work by the present inventors discloses two different LWA designs.

A first LWA design, shown in FIG. 1(*b*), is based on a tuneable high impedance surface (HIS) 1 and a static partially reflective surface (PRS) 2, each formed as a metasurface and arranged substantially parallel to each other. The first LWA design is configured to operate at 37 GHZ. As shown in FIG. 1(*b*), the HIS 1 and the PRS 2 are each formed by a two dimensional array of square conductive patch elements etched on a planar printed circuit board (PCB). The HIS 1 and PRS 2 each comprise a Rogers RT/Duroid 5880 substrate with a dielectric constant $\varepsilon_r$=2.2, a thickness $h_1$=0.787 mm, with copper cladding of thickness t=0.035 mm. The HIS 1 is etched to define a two dimensional array of square conductive patch elements 4, each having sides of length 1.53 mm and a periodicity of 1.83 mm, on a first dielectric substrate 100 of thickness $h_1$. The PRS 2 is etched to define a two dimensional array of square conductive patch elements 5, each having sides of length 3 mm and a periodicity of 3.3 mm, on a second dielectric substrate 200, also of thickness $h_1$. The HIS 1 is disposed substantially parallel to and above a conductive ground plane 3, the HIS 1 being spaced a distance $h_2$ above the ground plane 3. The PRS 2 is disposed over the HIS 1, and is spaced a distance $h_3$ above the HIS 1. The distance $h_3$ defines a cavity height of the LWA, and determines a resonance frequency of the LWA. The overall area of the HIS/PRS assembly is about 3 cm×9 cm. The ground plane 3 is mounted on a piezoelectric actuator 6, and is vertically displaceable by the piezoelectric actuator 6 so as to allow the distance $h_2$ to be varied. FIG. 1(*a*) shows an isolated unit cell of the HIS 1 of FIG. 1(*b*), but upside down relative to FIG. 1(*b*). A unit cell comprises a single square conductive patch element 4 on the first dielectric substrate 100. The conductive ground plane 3 is spaced a distance $h_2$ from the first dielectric substrate 100.

Corresponding edges of the HIS 1 and PRS 2 are joined at one side of the LWA by a reflector 7, and a printed dipole feeding antenna 8 is provided adjacent the reflector 7 and between the HIS 1 and PRS 2.

FIGS. 2(*a*) and 2(*b*) respectively show the simulated $S_{11}$ magnitude and $S_{11}$ phase response of the HIS reflection coefficients for various displacements $h_2$ of the LWA of FIG. 1(*b*) operating in a frequency band from 35 GHz to 40 GHz. The ground plane separation, $h_2$, can be varied from 0 µm to 400 µm. It can be seen that a variation from 40 µm to 400 µm ($\Delta h_2$=360 µm) produces a phase shift in reflection coefficients of the HIS 1 ($\varphi_{HIS}$) of about $\Delta\varphi_{HIS}$=142° at 37 GHz while exhibiting negligibly low loss of about 0.06 dB. A flexure amplified piezoelectric actuator 6 may be employed to adjust the displacement $h_2$ between the periodic array layer of the HIS 1 and the ground plane 3. Similarly, the simulated $S_{11}$ absolute magnitude (R) and phase ($\varphi_{PRS}$) of the PRS 2 can be obtained, and these are 0.94 and 156° respectively at 37 GHz. The directivity and main beam angle of the LWA will depend on the $S_{11}$ responses of both the HIS 1 and the PRS 2, according to the relation:

$$P = \frac{1 - R^2}{1 + R^2 - \cos\left(\varphi_{PRS} - \varphi_{HIS} - \frac{4\pi}{\lambda} \cdot h_3 \cdot \cos(\theta)\right)} \cdot F^2(\theta) \tag{1}$$

where F(θ) is the radiation power pattern of the feeding element, and λ is the operating wavelength. The phase shift provided by the HIS 1 is given by the relation:

$$\varphi_{HIS} = 2\varphi_t - \frac{4\pi}{\lambda} h_3 - \pi \tag{2}$$

where $\varphi_t$ is the phase shift applied to a wave as it passes through the patterned metal surface.

It is predicted, using equations (1) and (2) that the LWA will exhibit a beam steering range of about 37° (14° to) 51° for an HIS phase shift of $\Delta\varphi_{HIS}$=142° at 37 GHz, as shown in FIG. 3.

The piezoelectric actuator 6 may comprise a linear piezoelectric actuator with flexure amplification, and may give a displacement of up to 0.5 mm. The piezoelectric actuator 6, on which the ground plane 3 is disposed, can expand or contract depending on an applied DC biasing voltage, thus allowing the displacement $h_2$ to be varied as required.

The printed dipole antenna 8 of the LWA is a half-wave antenna designed to operate at 37 GHZ, as shown for example in FIG. 4. Directivity of the printed dipole antenna 8 is enhanced by placing a reflector 7 (see FIG. 1(*b*)) at 0.9 mm from a rear side of the antenna 8. Implementing the printed dipole antenna 8 in an LWA having 9×27 PRS elements and 16×49 HIS elements and running an appropriate simulation centred on an operating frequency of 37 GHz gives rise to the $S_{11}$ response shown in FIG. 5(*a*) for different values of $h_2$. The far-field radiation patterns (FRPs) in the H-plane at 37 GHz for various $h_2$ values are shown in FIG. 5(*b*). As can be seen, the $S_{11}$ response remains below −10 dB at around 37 GHz for the various displacements. The maximum gain of the LWA is 23.9 dBi with a maximum beam steering of 33° at 37 GHz for $h_2$ variations from 40 μm to 400 μm.

A second LWA design, shown in FIG. 6, has been proposed for the low-THz band (e.g. around 280 GHz). In order to reduce the structural complexity, this second LWA design comprises a circular aperture periodic PRS 10 and omits the HIS close to the ground plane 3. In this variation, the PRS 10 is displaced vertically relative to the ground plane 3 by way of a piezoelectric actuator 6, thus allowing the resonant cavity height $h_3$ to be adjusted. The PRS 10 takes the form of a metallic layer of thickness $h_1$=0.3 mm, with a two dimensional 11×31 array of circular apertures 11 each of diameter 0.6 mm and periodicity 0.75 mm. The metallic ground plane 3 has a thickness $h_2$, and the PRS 10 is disposed at a distance of 0.46 mm above the ground plane 3, with the cavity height $h_3$ being variable between 0.44 mm to 0.5 mm by applying different DC biasing currents to the piezoelectric actuator 6. The thickness $h_2$ is typically of the order of millimetres so as to provide a stable base and to provide enough anchorage for a flange of a standard waveguide feed. Preferably, the thickness $h_2$ is greater than a skin depth, ideally greater than two skin depths. The LWA is excited by a waveguide-fed slot element 12 formed towards one edge of the ground plane 3. Embodiments with or without a HIS 1 close to the ground plane 3 can be designed for frequencies at least between 20 GHz and 1 THz.

FIGS. 7(*a*) and 7(*b*) show the simulation results for the second LWA design operating at 280 GHz, with FIG. 7(*a*) showing the FRP in the H-plane, and FIG. 7(*b*) showing the $S_{11}$ response, in each case for different values of $h_3$. It can be seen that the LWA has a maximum gain of 18 dBi and produces beam steering over a range of about 18° within 3 dB gain loss over a 0.06 mm range of displacements. However, it can be seen that the $S_{11}$ response rises up from −10 dB for some displacements.

While the earlier work by the present inventors has shown that beam steering is possible, there remains room for improvement.

BRIEF SUMMARY OF THE DISCLOSURE

Viewed from a first aspect, there is provided a leaky-wave antenna device comprising:

a first metasurface comprising a first dielectric substrate having a first array of conductive elements;

a second metasurface comprising a second dielectric substrate having a second array of conductive elements;

a conductive ground plane;

a micro-actuator; and a feed comprising a pair of switchable dipoles;

wherein the first and second metasurfaces and the conductive ground plane are in a stacked arrangement and substantially parallel to one another, with the first metasurface located between the second metasurface and the conductive ground plane;

wherein a spacing between the conductive ground plane and the first metasurface is adjustable by operation of the micro-actuator; and wherein the feed is disposed between the first and second metasurfaces at a location corresponding to a centre of the first and second arrays.

The first metasurface may be configured as a high impedance surface.

The second metasurface may be configured as a partially reflective surface.

The first and second metasurfaces are designed so as to impart an engineered phase shift to RF signals when such signals are reflected by the respective metasurface. By altering or adjusting the spacing between the conductive ground plane and the first metasurface, it is possible to change the amount of phase shift applied to a reflected RF wave. Accordingly, by controlling the micro-actuator, it is possible dynamically to alter the reflective properties of the first metasurface.

The first and second metasurfaces may be spaced from each other by a distance $h_1$. The first metasurface may be spaced from the conductive ground plane by a distance $h_2$. The distance $h_1$ may be fixed, while the distance $h_2$ is adjustable across a predetermined range of distances by way of the micro-actuator.

The micro-actuator may be a piezoelectric actuator. The micro-actuator may be any other type of fast switching micro-actuator, including but not limited to solenoid actuators, electroactive polymer actuators, microelectromechanical systems, magnetic drive actuators or micromotors. The conductive ground plane may be mounted on or connected to the micro-actuator so that the micro-actuator can move the conductive ground plane relative to the first metasurface, thereby controllably to adjust the distance $h_2$.

The first array of conductive elements may be formed on or in the first dielectric substrate. The second array of conductive elements may be formed on or in the second dielectric substrate. The conductive elements may be formed, for example, by way of etching, printing and/or micromachining.

The conductive elements of the first array may all be substantially identical. In some embodiments, the conductive elements of the first array are square patches. The conductive elements of the first array need not be square, but may have other shapes of any appropriate geometry that can be modified to allow to the required phase shift sensitivity. The conductive elements of the first array may have a first size and a first periodicity.

The conductive elements of the second array may all be substantially identical. In some embodiments, the conductive elements of the second array are square patches. The conductive elements of the second array need not be square, but may have other shapes of any appropriate geometry that can be modified to allow to the required phase shift sensitivity. The conductive elements of the second array may have a second size and a second periodicity.

The first and second sizes and/or the first and second periodicities may be the same or different. In some embodiments, the first size is smaller than the second size. In some embodiments, the first periodicity is smaller than the second periodicity. In some embodiments, the first size is smaller than the second size and the first periodicity is smaller than the second periodicity.

Preferably, the conductive elements of the first and second arrays are formed on the surfaces of their respective dielectric substrates that face the ground plane. This arrangement provides the greatest control over the phase of the reflected wave. It is possible to form the conductive elements of one or both of the first and second arrays on the opposite surface of the respective dielectric substrate, but this may reduce the range of possible phase shifts and may thus reduce the range of beamsteering that can be obtained.

The first dielectric substrate may have a thickness in a range of 0.01 to 2 wavelengths. The first dielectric substrate may have a dielectric constant $\varepsilon_r$ greater than 1, optionally about 2.3. The conductive elements of the first array may be any suitable thickness if the geometry of the patches are appropriately designed. The conductive elements of the first array may be square patches of side lengths between 0.01 and 0.5 wavelengths; for operation at 25.5 GHZ, the side lengths may be about 1.5 mm, optionally 1.53 mm. The conductive elements of the first array may have a periodicity between 0.01 and 0.5 wavelengths; for operation at 25.5 GHZ, the periodicity may be about 1.8 mm, optionally 1.83 mm.

The second dielectric substrate may have a thickness in a range of 0.01 to 2 wavelengths. The first dielectric substrate may have a dielectric constant $\varepsilon_r$ greater than 1, optionally about 2.3. The conductive elements of the second array may be square patches of side lengths between 0.01 and 0.5 wavelengths, optionally about 3 mm for operation at 25.5 GHz. The conductive elements of the second array may have a periodicity between 0.01 and 1.0 wavelengths; for operation at 25.5 GHz, the periodicity may be about 3.3 mm, optionally 3.30 mm.

The spacing $h_1$ between the first and second metasurfaces is typically about equal to an operating half wavelength multiple, allowing for optimisation and dielectric effects.

The spacing $h_2$ between the first metasurface and the conductive ground plane may be adjusted by the micro-actuator by some fraction of a wavelength, optionally between 0 mm to 2 mm, optionally from 0 μm to 500 μm. In some embodiments, the spacing $h_2$ may be adjusted to be from 25 μm to 400 μm. When the conductive elements of the first array on the first metasurface touch the conductive ground plane ($h_2$=0 μm), the first metasurface becomes fully reflective, effectively removing the effect of the metasurface.

The micro-actuator may be configured to allow a substantially continuous adjustment of the spacing $h_2$. Alternatively, the micro-actuator may be configured to adjust the spacing $h_2$ in a step-wise manner.

The first and second arrays may take a wide range of array sizes. It is generally preferred for the arrays to be large from the perspective of the waves passing through the metasurfaces. In some embodiments, the arrays may be of the order of 10s by 10s. In some embodiments, the arrays may be of the order of 100s by 100s or larger.

The feed comprises a pair of switchable dipoles disposed between the first and second metasurfaces at a location corresponding to a centre of the first and second arrays. This has the surprising advantage of enabling a greater range of beam steering than the earlier LWA devices proposed by the present inventors.

The feed may be configured as a microstrip feed or a waveguide feed.

The pair of switchable dipoles is configured so that one of the pair of dipoles excites a right hand side of the LWA and the other of the pair of dipoles excites a left hand side of the LWA. In this way, a LWA can be constructed so that RF current can selectively flow in two opposed directions. By selectively energising one or other of the pair of switchable dipoles, and by adjusting the spacing $h_2$ by way of the microactuator, it is possible to achieve beam steering across a greater range than in the prior art LWAs. For example, in some embodiments, beam steering through a range of at least −40° to +40° (relative to a line perpendicular to the second metasurface) is achievable.

Several LWAs could be used in an array, geometrically spaced so to provide sectors of, for example, ±40°. In this way, five LWAs could be used to cover 360° around one radial plane.

Embodiments of the present disclosure provide a highly efficient antenna device, particularly well-suited for mm-wave and/or terahertz applications. Because the micro-actuated tuning mechanism of embodiments of the present disclosure is based on relatively small adjustments of the spacing between the first metasurface and the conductive ground plane, and has no active elements in the path of the RF signals, the efficiency of the LWA will be very high. In some embodiments, good RF matching is obtained between 26 GHz and 28 GHz for $h_2$ values up to 200 μm. This is a wide enough bandwidth for use with 5G infrastructure.

Viewed from a second aspect, there is provided a leaky-wave antenna device comprising:

- a metasurface comprising a periodic array of conductive elements, or a periodic array of apertures in a conductive layer;
- a conductive ground plane;
- a micro-actuator; and
- a feed comprising a pair of switchable dipoles;
- wherein the metasurface and the conductive ground plane are in a stacked arrangement and substantially parallel to one another;
- wherein a spacing between the conductive ground plane and the metasurface is adjustable by operation of the micro-actuator; and
- wherein the feed is disposed on the conductive ground plane or between the conductive ground plane and the metasurface, at a location corresponding to a centre of the periodic array.

The metasurface may be configured as a partially reflective surface.

The metasurface is designed so as to impart an engineered phase shift to RF signals when such signals are reflected by the metasurface. By altering or adjusting the spacing between the conductive ground plane and the metasurface, it is possible to change the amount of phase shift applied to a reflected RF wave. Accordingly, by controlling the micro-actuator, it is possible dynamically to alter the reflective properties of the metasurface.

The metasurface and the conductive ground plane may be spaced from each other by a distance $h_2$. The distance $h_2$ is adjustable across a predetermined range of distances by way of the micro-actuator.

The micro-actuator may be a piezoelectric actuator. The micro-actuator may be any other type of fast switching micro-actuator, including but not limited to solenoid actuators, electroactive polymer actuators, microelectromechanical systems, magnetic drive actuators or micromotors. The conductive ground plane may be mounted on or connected to the micro-actuator so that the micro-actuator can move the conductive ground plane relative to the metasurface, thereby controllably to adjust the distance $h_2$. Alternatively, the metasurface may be mounted on or connected to the micro-actuator so that the micro-actuator can move the metasurface relative to the conductive ground plane, thereby controllably to adjust the distance $h_2$.

The periodic array may comprise a periodic array of conductive elements formed on or in a dielectric substrate. The conductive elements may be formed, for example, by way of etching, printing and/or micromachining. Alternatively, the periodic array may comprise a periodic array of apertures formed in a conductive layer. The apertures may be formed, for example, by way of etching and/or micromachining.

The apertures or conductive elements of the periodic array may all be substantially identical. In some embodiments, the apertures of the periodic array are substantially circular. The apertures or conductive elements of the periodic array may have other shapes of any appropriate geometry that can be modified to allow to the required phase shift sensitivity. The apertures or conductive elements of the periodic array may have a given size and a given periodicity.

The spacing $h_2$ between the metasurface and the conductive ground plane may be adjusted by the micro-actuator by some fraction of a wavelength, optionally between 0 mm to 2 mm, optionally from 0 μm to 500 μm. In some embodiments, the spacing $h_2$ may be adjusted to be from 25 μm to 400 μm. When the apertures or conductive elements of the periodic array on the metasurface touch the conductive ground plane ($h_2$=0 μm), the metasurface becomes fully reflective, effectively removing the effect of the metasurface.

The micro-actuator may be configured to allow a substantially continuous adjustment of the spacing $h_2$. Alternatively, the micro-actuator may be configured to adjust the spacing $h_2$ in a step-wise manner.

The periodic array may take a wide range of array sizes. It is generally preferred for the array to be large from the perspective of the waves passing through the metasurface. In some embodiments, the array may be of the order of 10s by 10s. In some embodiments, the array may be of the order of 100s by 100s or larger.

In embodiments of the second aspect, where sufficient movement is provided by the micro-actuator, a leaky-wave antenna device is enabled that requires only a single metasurface. The single metasurface disposed over the conductive ground plane defines a cavity therebetween.

The feed comprises a pair of switchable dipoles disposed between the metasurface and the conductive ground plane at a location corresponding to a centre of the periodic array. The feed may be configured as a microstrip feed or a waveguide feed on or in the conductive ground plane. This has the surprising advantage of enabling a greater range of beam steering than the earlier LWA devices proposed by the present inventors.

The pair of switchable dipoles is configured so that one of the pair of dipoles excites a right hand side of the LWA and the other of the pair of dipoles excites a left hand side of the LWA. In this way, a LWA can be constructed so that RF current can selectively flow in two opposed directions. By selectively energising one or other of the pair of switchable dipoles, and by adjusting the spacing $h_2$ by way of the microactuator, it is possible to achieve beam steering across a greater range than in the prior art LWAs. For example, in some embodiments, beam steering through a range of at least −40° to +40° (relative to a line perpendicular to the metasurface) is achievable.

Several LWAs could be used in an array, geometrically spaced so to provide sectors of, for example, ±40°. In this way, five LWAs could be used to cover 360° around one radial plane.

Embodiments of the first or second aspects using switchable dipoles can be configured for operation at frequencies up to 100 GHz.

BRIEF DESCRIPTION OF THE DRAWINGS

Embodiments of the invention are further described hereinafter with reference to the accompanying drawings, in which:

FIG. 1(*b*) shows a prior art LWA comprising a HIS disposed between a PRS and a conductive ground plane;

FIG. 2(*b*) shows the simulated $S_{11}$ phase response for different displacements of the ground plane of the LWA of FIG. 1(*b*);

FIG. 5(*b*) shows the simulated far-field radiation pattern for the PDA of FIG. 4 in the LWA of FIG. 1(*b*) for different displacements of the ground plane;

FIG. 7(*b*) shows the simulated $S_{11}$ response of the LWA of FIG. 6;

FIG. 11(*b*) shows a first detail of the dipole feed of FIG. 11(*a*);

FIG. 11(*c*) shows a second detail of the dipole feed of FIG. 11(*a*)

DETAILED DESCRIPTION

Figure 8:
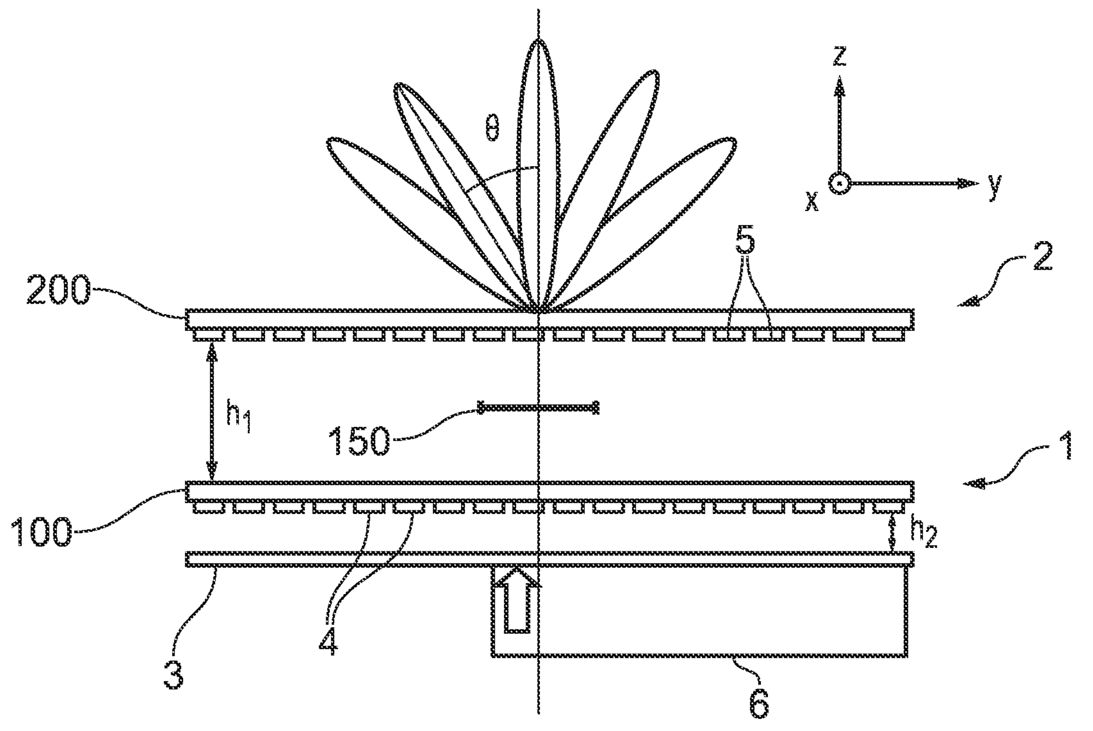
FIG. 8 shows an LWA of an embodiment of the present disclosure.

FIG. 8 shows an LWA of an embodiment of the present disclosure. Similarly to the LWA of FIG. 1(*b*), the LWA comprises a tuneable high impedance surface (HIS) 1 and a static partially reflective surface (PRS) 2, each formed as a metasurface and arranged substantially parallel to each other. The illustrated LWA is configured to operate at 26 GHZ to 28 GHz, but may be configured to operate at other GHz frequencies as required. The HIS 1 and the PRS 2 are each formed by a two dimensional array of conductive patch elements etched on a planar dielectric PCB substrate 100, 200. The substrates 100, 200 may each comprise a Rogers RT/Duroid 5880 substrate with a dielectric constant $\in_r=2.2$, a thickness of around 0.8 mm, with copper cladding of thickness around 0.035 mm, although these measurements are merely exemplary and non-limiting. The HIS 1 is etched to define a first two dimensional array of conductive patch elements 4. The PRS 2 is etched to define a second two dimensional array of conductive patch elements 5. The HIS 1 is disposed substantially parallel to and above a conductive ground plane 3, the HIS 1 being spaced a distance $h_2$ above the ground plane 3. The PRS 2 is disposed over the HIS 1, and is spaced a distance $h_1$ above the HIS 1. The distance $h_1$ defines a cavity height of the LWA, and determines a resonance frequency of the LWA. The ground plane 3 is mounted on a piezoelectric actuator 6, and is vertically displaceable by the piezoelectric actuator 6 so as to allow the distance $h_2$ to be varied.

Figure 1A:
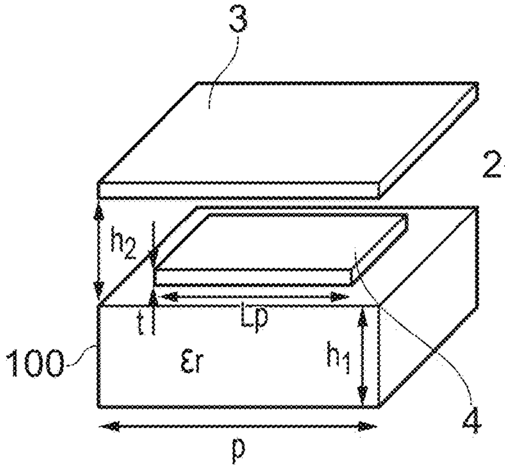
FIG. 1(a) Prior art
FIG. 1(*a*) shows a unit cell of a prior art HIS under a conductive ground plane.
Figure 1B:
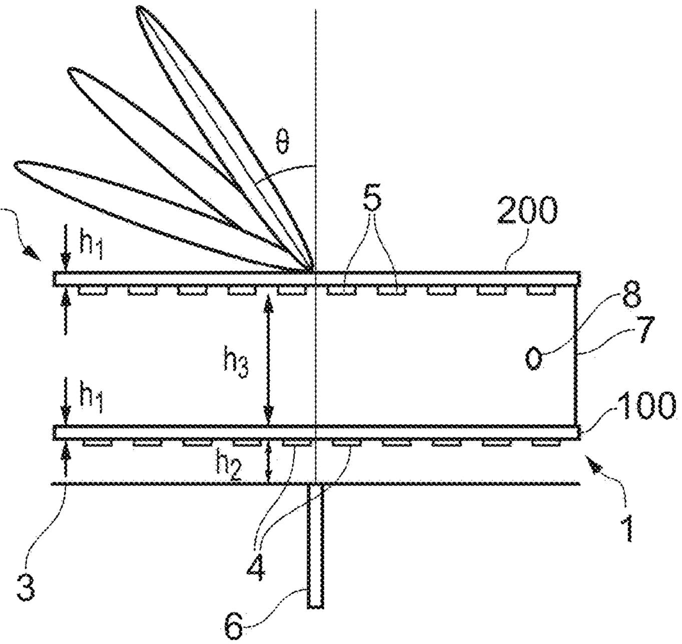
FIG. 1(b) Prior art
Figure 2A:
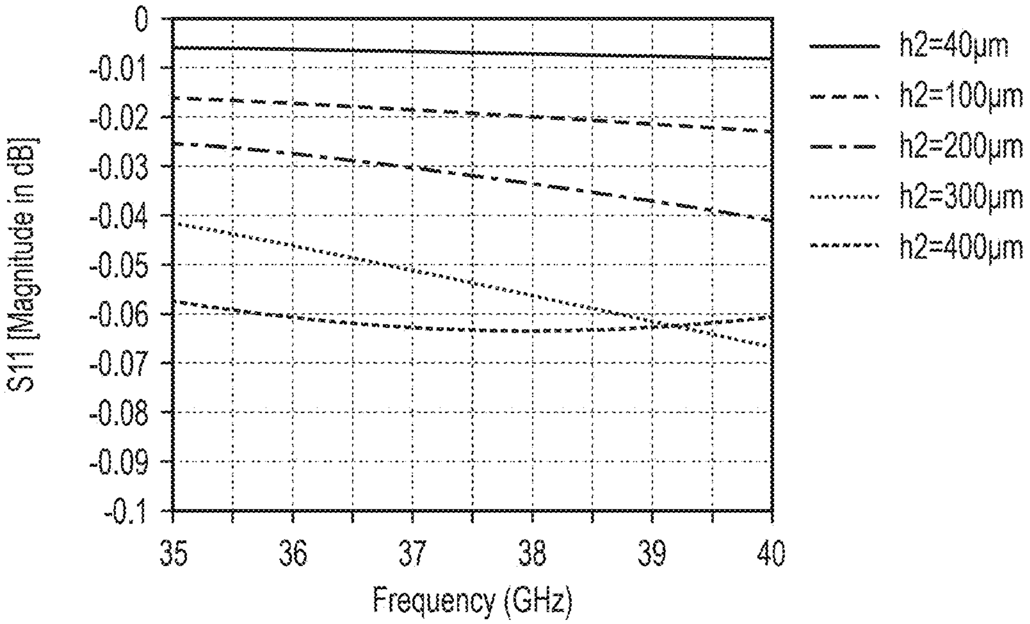
FIG. 2(a) Prior art
FIG. 2(*a*) shows the simulated $S_{11}$ magnitude response for different displacements of the ground plane of the LWA of FIG. 1(*b*)
Figure 2B:
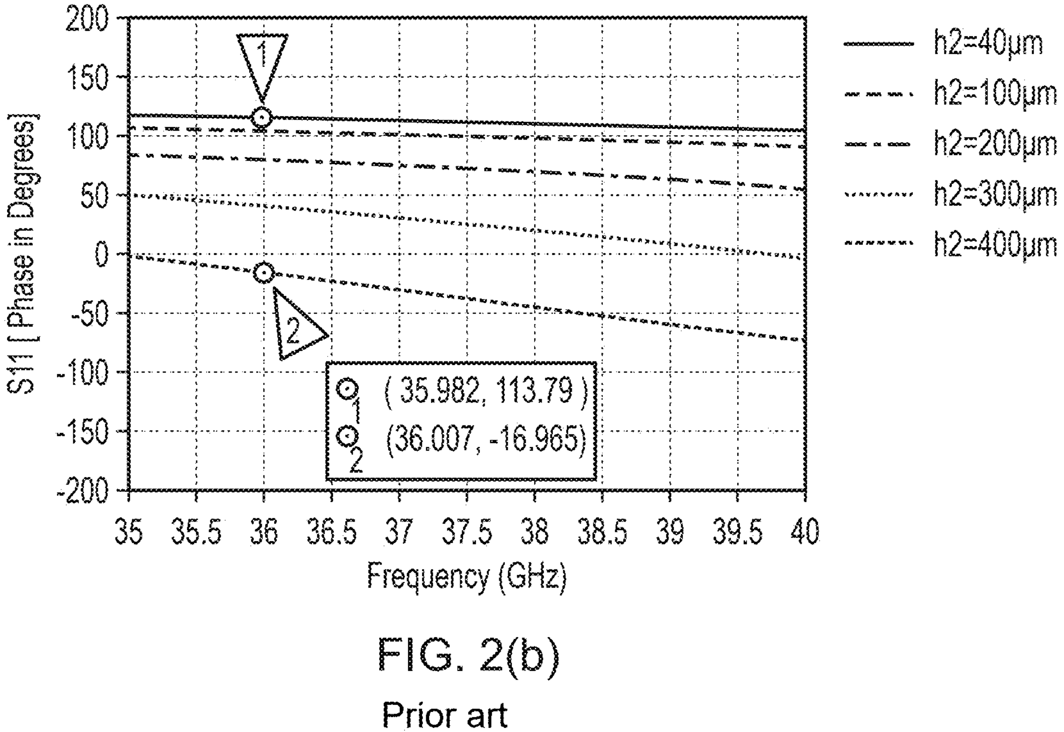
FIG. 2(b) Prior art
Figure 3:
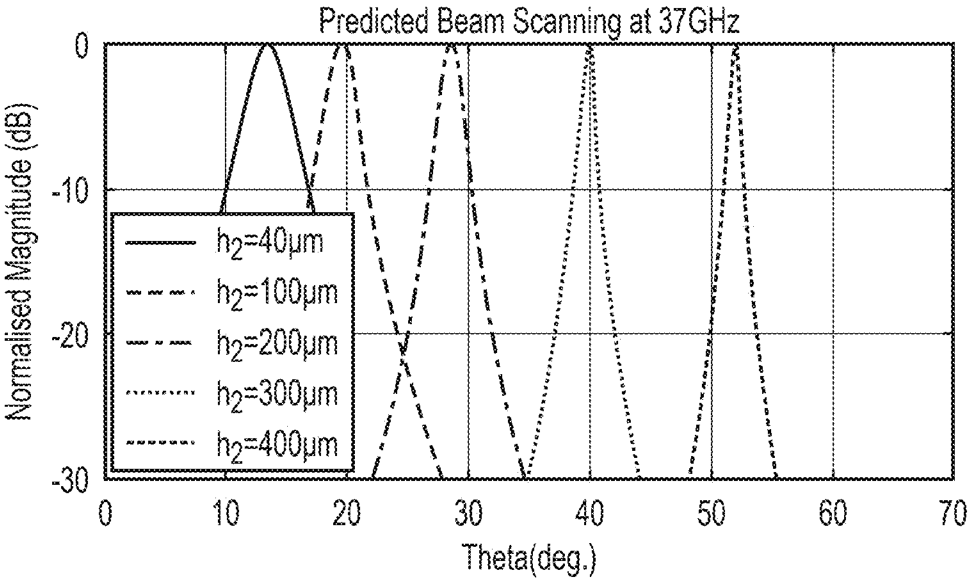
FIG. 3 Prior art
FIG. 3 shows the beam scanning achieved by the LWA of FIG. 1(*b*)
Figure 4:
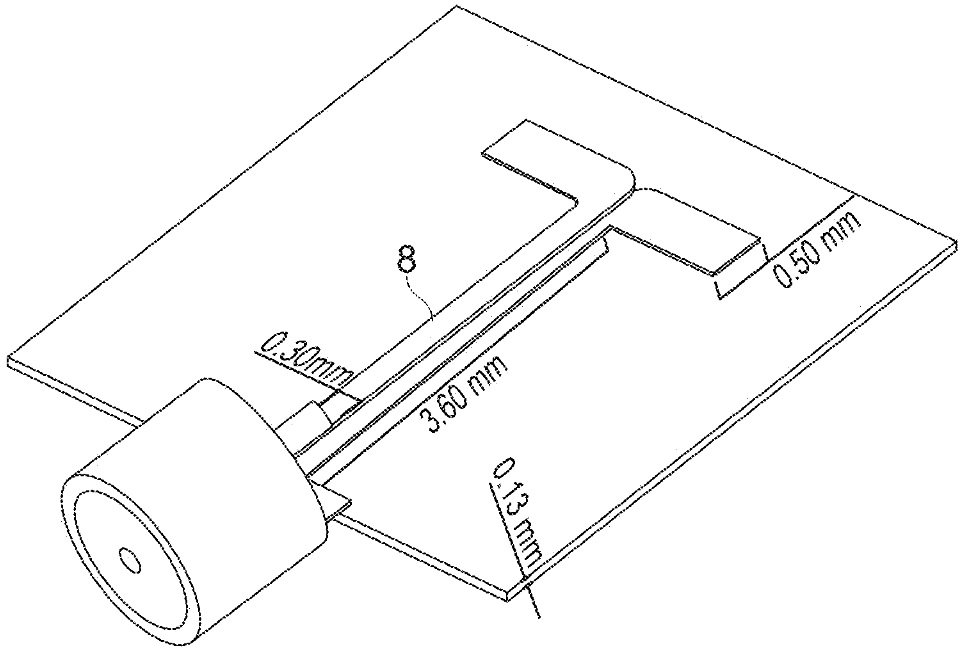
FIG. 4 Prior art
FIG. 4 shows a printed dipole antenna (PDA) suitable for use with the LWA of FIG. 1(*b*) and also with embodiments of the present disclosure.
Figure 5A:
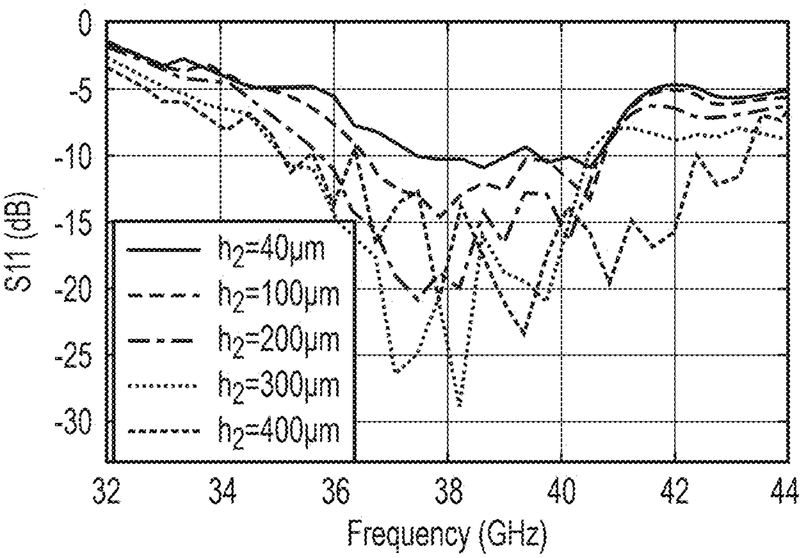
FIG. 5(a) Prior art
FIG. 5(*a*) shows the simulated $S_{11}$ response for the PDA of FIG. 4 in the LWA of FIG. 1(*b*) for different displacements of the ground plane.
Figure 5B:
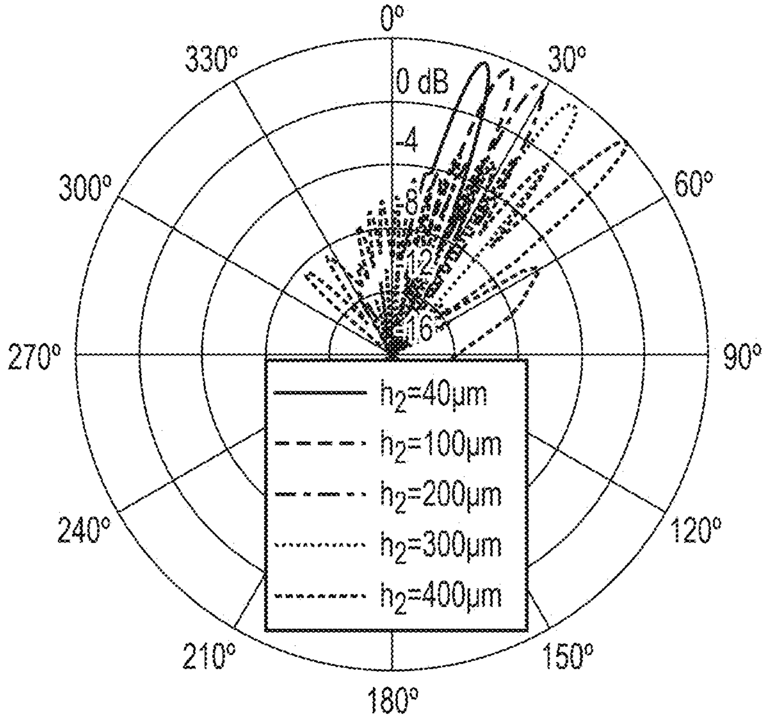
FIG. 5(b) Prior art
Figure 6:
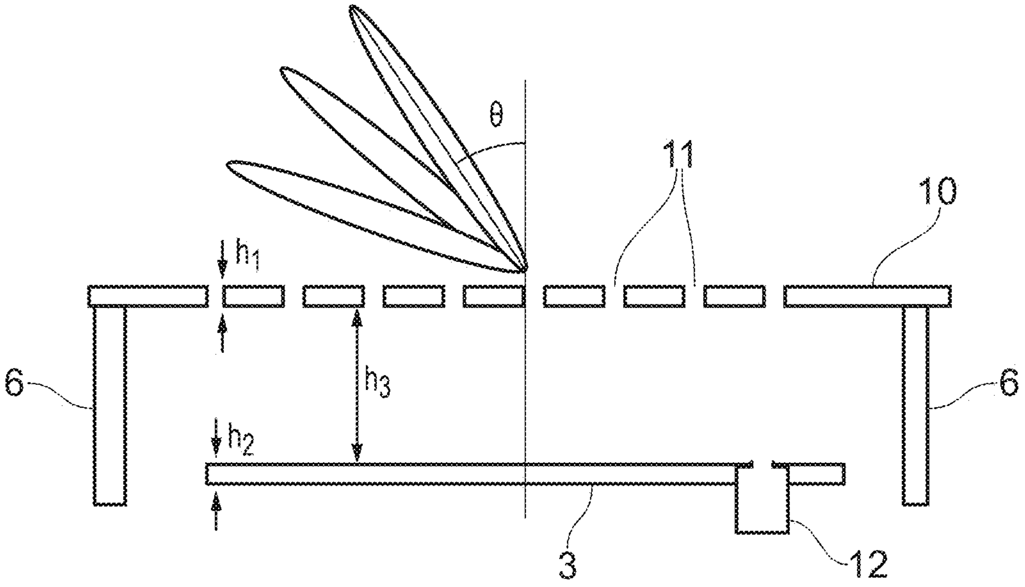
FIG. 6 Prior art
FIG. 6 shows an alternative prior art LWA comprising a metallic PRS with circular apertures and no HIS.
Figure 7A:
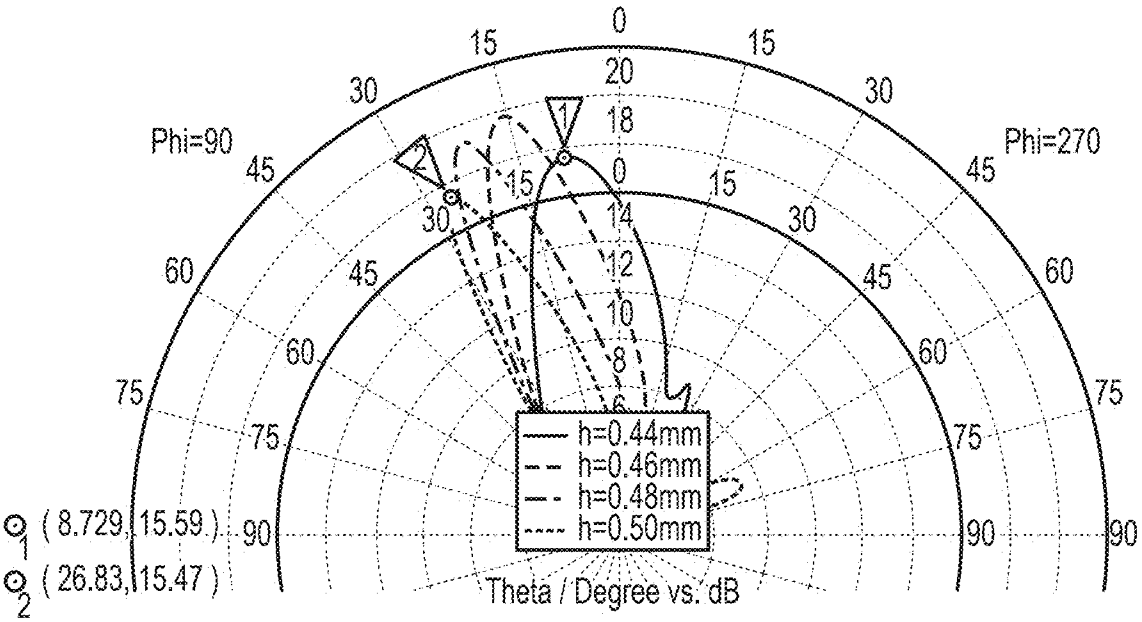
FIG. 7(a) Prior art
FIG. 7(*a*) shows the simulated far-field radiation pattern of the LWA of FIG. 6.
Figure 7B:
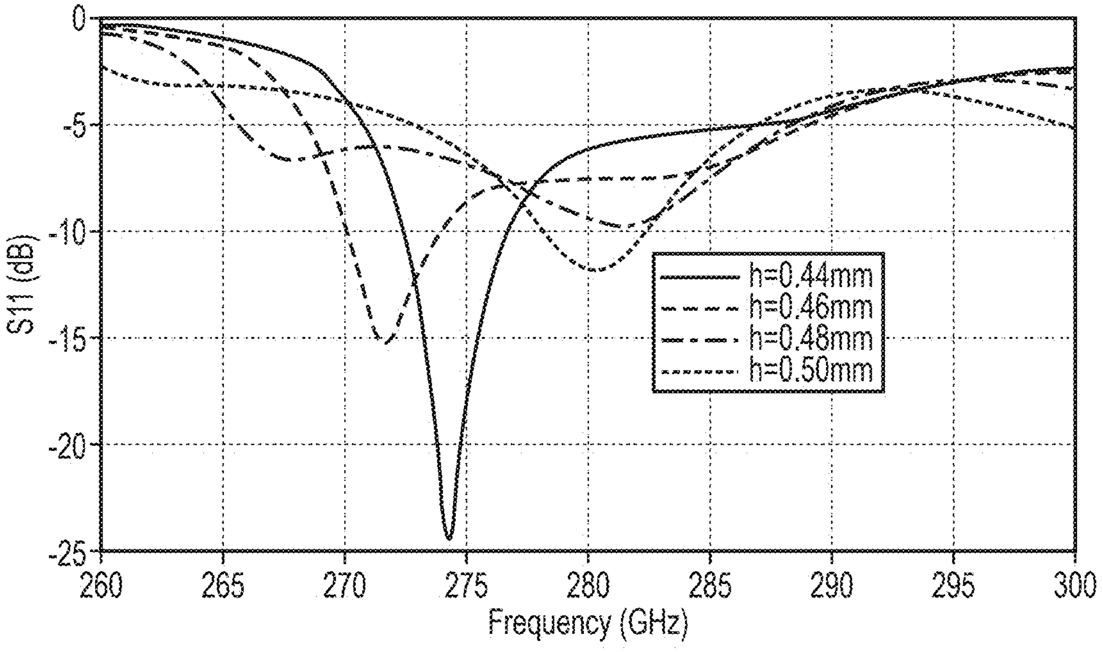
FIG. 7(b) Prior art

An important distinction over the prior art LWA of FIG. 1(*b*) is that, instead of a feeding antenna being located adjacent a reflector at one edge of the LWA, a feed 150 comprising a pair of switchable dipoles is disposed between the HIS 1 and the PRS 2 at a location corresponding to a centre of the first and second arrays. By employing a pair of switchable dipoles at this location, a surprising increase in the beam steering angle θ is obtained, in this example ±40° relative to a perpendicular to the PRS 2.

The feed 150, shown in more detail in FIGS. 11 and 12 and further described hereinbelow, is configured to selectively energise the LWA structure so as to augment the available beam scanning range.

Metamaterial devices are capable of being designed so that they reflect waves with an engineered phase shift applied. This can be done using a high impedance surface, which consists of a sheet of periodic metal patches printed onto a dielectric substrate, suspended over a ground plane. By altering the separation between the periodic array and the ground plane it is possible to change the amount of phase shift imparted onto a reflected wave. Therefore using a piezoelectric actuator (or other fast switching micro-actuator), it is possible to dynamically alter the reflective properties of the high impedance surface.

If such an HIS 1 is built into a leaky wave antenna (using a engineered partially reflective surface (PRS) 2) and fed from the centre with switchable dipoles 150, as shown in FIG. 8, a highly directive antenna is obtained that is capable of steering its main radiation beam with high efficiency at millimetre wave frequencies, where other competing technologies usually have increased losses.

Due to the fact that the tuning mechanism in the present disclosure represents only a slight adjustment in height, and has no active elements within the RF path itself, micro-actuated tuning offers best-in-class efficiencies. For example, good RF matching of the embodiment of FIG. 8 between around 26 GHz and 28 GHz has been demonstrated for separations $h_2$ up to 0.32 mm. This is a wide enough bandwidth for the latest communication systems used in 5G infrastructure.

Figure 9:
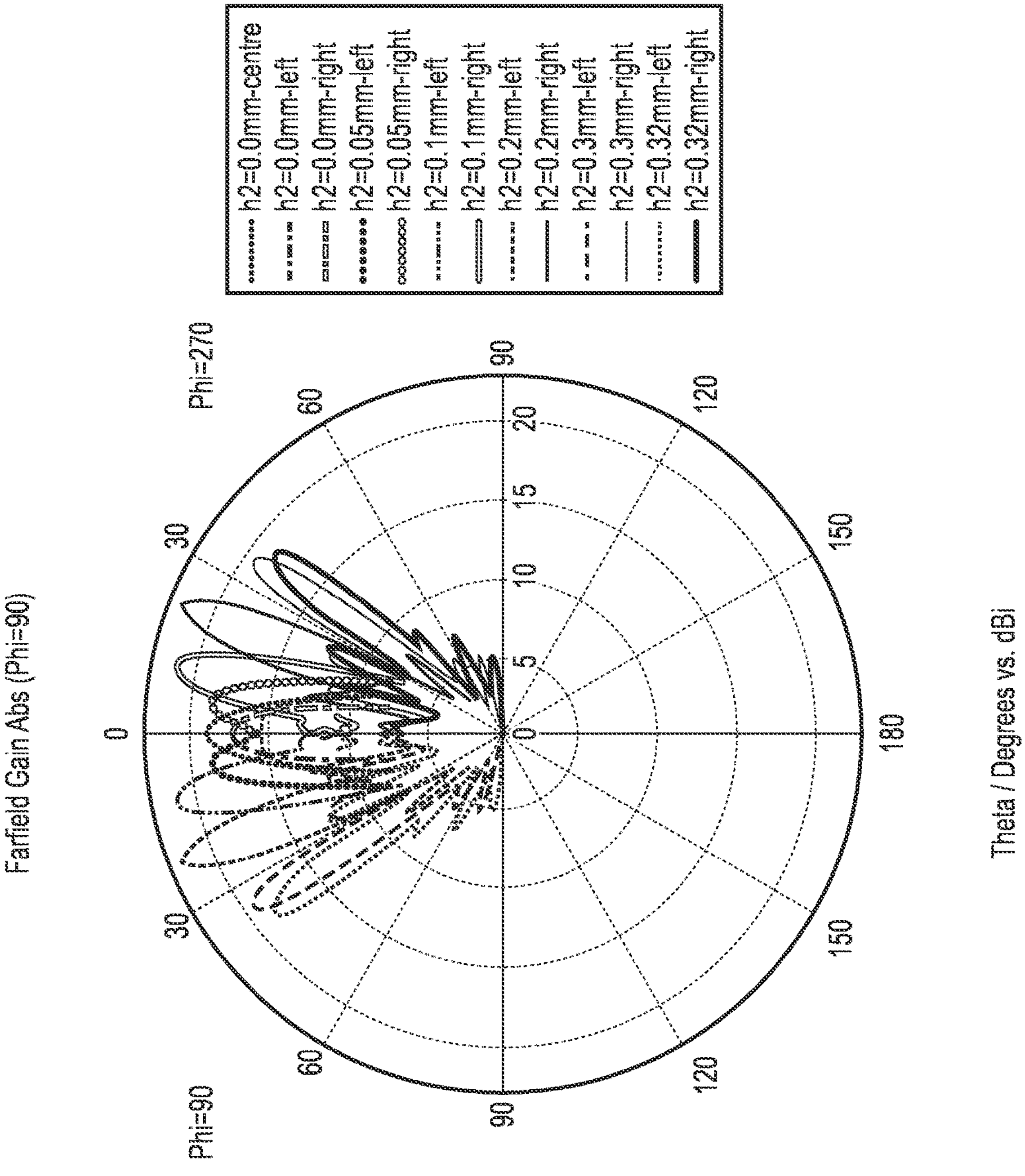
FIG. 9 shows the simulated far-field gain (absolute) at phi=90° of the LWA of FIG. 8 for different displacements of the ground plane.

By the positioning of a switchable pair of dipoles 150 within the metamaterial stack it is possible to produce a further switching element, either energising the right or left portions of the antenna, to produce a beam steering performance that can be seen in FIG. 9, which shows the far-field gain (absolute) (phi=) 90° for various separations $h_2$ from 0.0 mm up to 0.32 mm, and with the switchable dipole feed 150 energising either a right or a left portion of the antenna. Beam angles of between ±40° are possible, which enables 5G infrastructure to direct data toward individual consumers as they move around within the service area of a particular antenna system.

Figure 10:
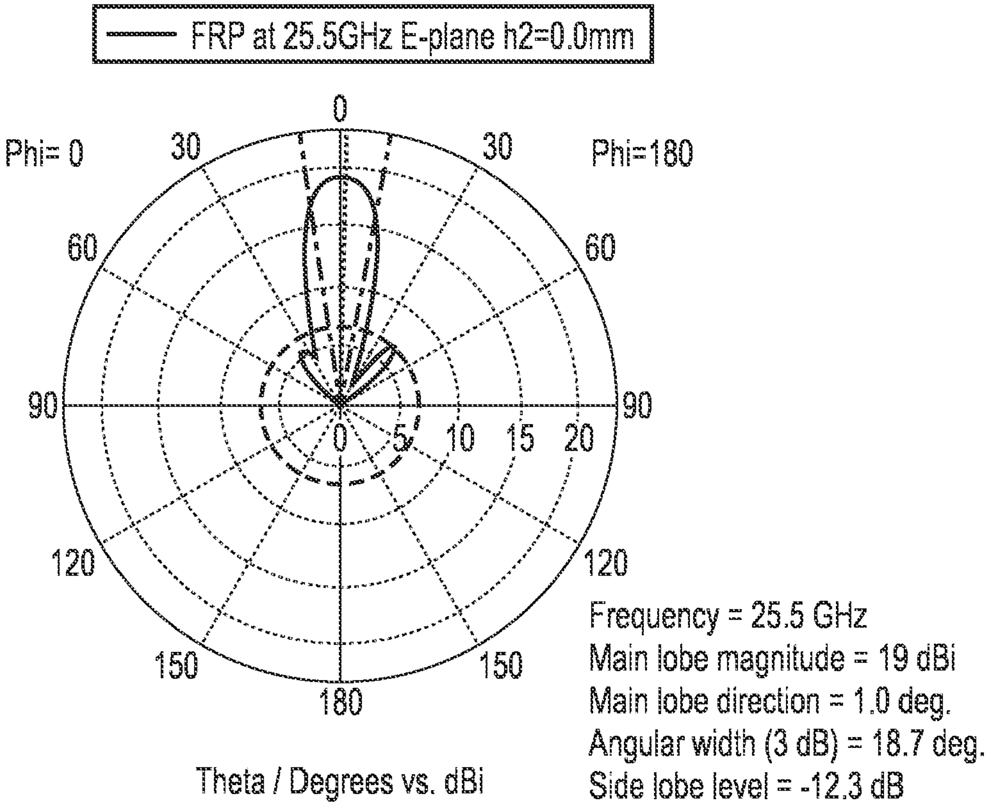
FIG. 10 shows the simulated far-field radiation pattern of the LWA of FIG. 8 in the E-plane at 25.5 GHz at zero displacement of the ground plane.

FIG. 10 shows the simulated far-field radiation pattern of the LWA of FIG. 8 in the E-plane at 25.5 GHZ (i.e. 26 GHZ) at zero displacement of the ground plane ($h_2$=0.0 mm). The E-plane is perpendicular to the H-plane shown in FIG. 9, which is the plane in which beam steering takes place. The main lobe magnitude is 19 dBi, at a direction of 1.0°. The angular width (3 dB) is 18.7° and the side lobe level is −12.3 dB.

The following table gives results for beam steering antenna simulation performance at 26 GHz:

| $h_2$ (mm) | Active feed | Peak gain (dBi) | Peak gain angle (°) | HPBW (°) |
|---|---|---|---|---|
| 0.0 | Right + left (centre) | 19 | 0 | 12.8 |
| 0.05 | Right/left | 18.8 | −7/+7 | 12.4 |
| 0.1 | Right/left | 21.3 | −12/+12 | 8.1 |
| 0.2 | Right/left | 22 | −22/+22 | 7.2 |
| 0.3 | Right/left | 19.6 | −35/+35 | 6.3 |
| 0.32 | Right/left | 18.7 | −39/+39 | 7.5 |

These devices match the electromagnetic requirements of 5G systems.

By providing a feed in the form of a pair of switchable dipoles at the centre of the leaky wave antenna, it becomes possible selectively to energise different parts of the leaky wave antenna, thus extending the possible beam scanning angles to result in a more commercially viable device.

Figure 11A:
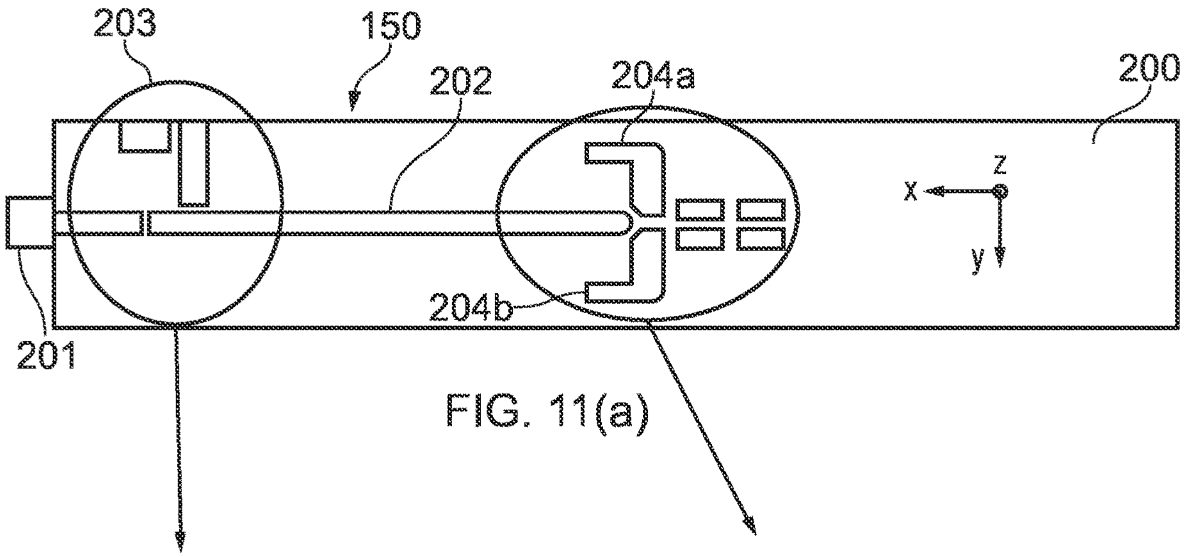
FIG. 11(*a*) shows a front view of a two-way switchable printed dipole feed.
Figure 11B:
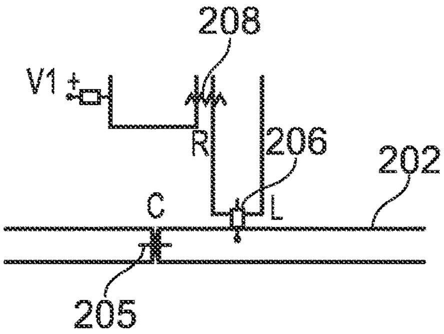
Figure 11C:
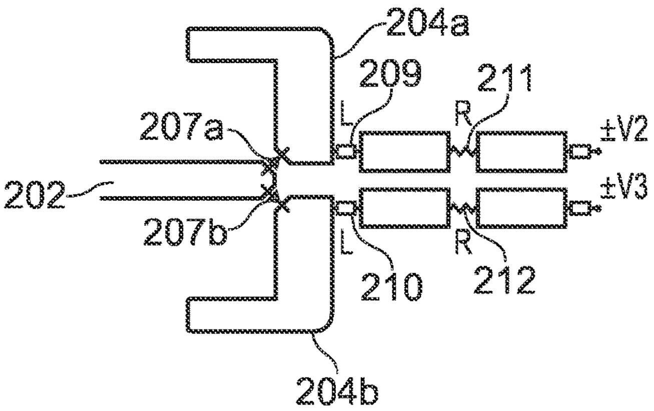

FIG. 11(*a*) shows a front view of an exemplary two-way switchable printed dipole feed indicated generally at 150. The feed 150 comprises conductive tracks printed on a front surface of a dielectric substrate 200 that includes an RF connector 201 at one end. In the illustrated arrangement, the dielectric substrate 200 is RT/Duroid 5880 substrate of thickness 0.254 mm, although it will be appreciated that other appropriate dielectric substrates may be used. A feed line 202 extends from the RF connector 201, via a biasing network 203, towards front surface dipole arms 204*a*, 204*b*, shown here as pointing back towards the RF connector 201. The front surface dipole arms 204*a*, 204*b* are shown in more detail in FIG. 11(*c*).

In the biasing network 203, shown in more detail in FIG. 11(*b*), a capacitor 205 is provided to prevent the DC biasing current, supplied at V1, from flowing back towards the RF connector 201. An inductor 206 is provided between V1 and the feed line 202 to prevent RF currents flowing back to the DC biasing circuit. A resistor 208 is included in the biasing network 203 to control the DC biasing current to an appropriate level for the pin diodes 207*a*, 207*b* that connect the feedline 202 to the front surface dipole arms 204*a*, 204*b*. The DC biasing current terminates, respectively, at V2 or V3, by way of inductors 209, 210 and resistors 211, 212, as shown in FIG. 11(*c*).

Figure 12:
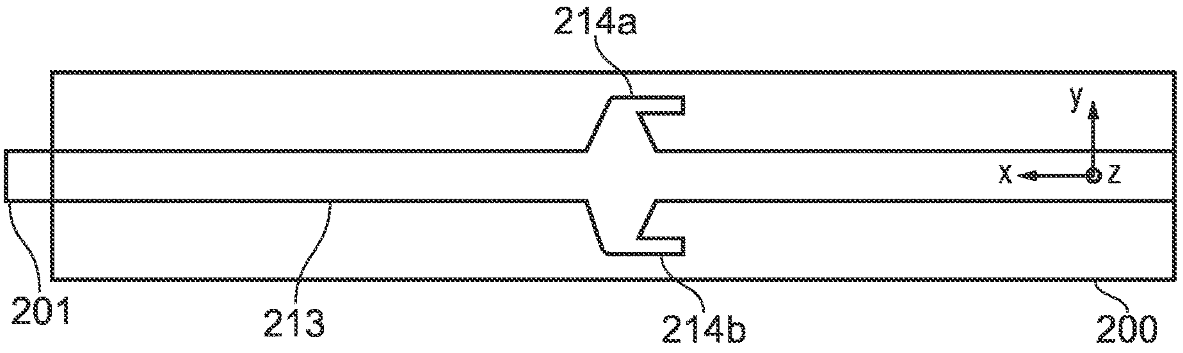
FIG. 12 shows a rear view of the dipole feed of FIG. 11(*a*).

A grounded strip line 213 is provided on the rear surface of the dielectric substrate 200, as shown in FIG. 12. The grounded strip line 213 follows the path of the feed line 202 and includes rear surface dipole arms 214*a*, 214*b*, shown here as pointing away from the RF connector 201. The grounded strip line 213 is placed at a quarter wavelength distance from the feed line 202 and acts as a reflector to direct the dipole antenna radiation along the y-axis.

Respective front surface and rear surface dipole arms 204*a*, 214*a* on the one hand, and 204*b*, 214*b* on the other hand, define a pair of dipoles arranged one on either side of the feed line 202 and the grounded strip line 213. The dipoles can be energised separately or together, depending on operation of the pin diodes 207*a*, 207*b*. For example, if pin diode 207*a* is switched to allow current to pass to the front surface dipole arm 204*a*, then the dipole formed by front surface dipole arm 204*a* and rear surface dipole arm 214*a* is energised and can radiate. Likewise, if pin diode 207*b* is switched to allow current to pass to the front surface dipole arm 204*b*, then the dipole formed by front surface dipole arm 204*b* and rear surface dipole arm 214*b* is energised and can radiate. If only one of the dipoles is energised and radiates, then the beam is steered towards the corresponding side of the LWA (positive or negative y-axis). If both of the dipoles are energised and radiate, then the beam will be a central beam.

The illustrated printed dipole feed 150 allows the $S_{11}$ return loss to be kept below 10 dB, with the radiation main beam directed to the left, right or centre depending on whether one or other or both of the pin diodes 207*a*, 207*b* is switched on. Once an appropriate pin diode 207*a*, 207*b* state is set for a desired beam orientation, the piezoelectric actuator 6 biasing voltage is varied so as to adjust the spacing distance $h_2$, thereby to tune the HIS 1 to steer the LWA main beam to a desired pointing angle.

The printed dipole feed 150 shown in FIGS. 11 and 12 is merely exemplary, and other configurations are possible.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A leaky-wave antenna device comprising:

a first metasurface comprising a first dielectric substrate having a first array of conductive elements;

a second metasurface comprising a second dielectric substrate having a second array of conductive elements;

a conductive ground plane;

a micro-actuator; and a feed comprising a pair of switchable dipoles;

wherein the first and second metasurfaces and the conductive ground plane are in a stacked arrangement and substantially parallel to one another, with the first metasurface located between the second metasurface and the conductive ground plane;

wherein a spacing between the conductive ground plane and the first metasurface is adjustable by operation of the micro-actuator; and wherein the feed is disposed between the first and second metasurfaces at a location corresponding to a centre of the first and second arrays.

2. The antenna device as claimed in claim 1, wherein the first metasurface is configured as a high impedance surface.

3. The antenna device as claimed in claim 1, wherein the second metasurface is configured as a partially reflective surface.

4. The antenna device as claimed in claim 1, wherein the micro-actuator is a piezoelectric actuator.

5. The antenna device as claimed in claim 1, wherein the micro-actuator is a fast switching micro-actuator.

6. The antenna device as claimed in claim 1, wherein the pair of switchable dipoles is configured so that one of the pair of dipoles excites a first side of the antenna device relative to the centre and the other of the pair of dipoles excites a second side of the antenna device relative to the centre.

7. The antenna device as claimed in claim 6, wherein the pair of switchable dipoles is configured to excite RF currents that selectively flow in two opposed directions.

8. The antenna device as claimed in claim 1, configured to steer a beam through a range of at least −40° to +40° relative to a line perpendicular to the first metasurface by selectively energising one of the pair of switchable dipoles, and by adjusting the spacing of the first metasurface from the conductive ground plane by way of the micro-actuator.

9. The antenna device of claim 1, wherein the micro-actuator is configured to move the first metasurface.

10. The antenna device of claim 1, wherein the micro-actuator is configured to move the conductive ground plane.

11. The antenna device as claimed in claim 1, wherein the feed comprises a feed line disposed on a front surface of a dielectric substrate, with first and second front surface dipole arms extending either side of the feed line, and a grounded strip line disposed on a rear surface of the dielectric substrate, following a path defined by the feed line on the first surface of the dielectric substrate, with first and second rear surface dipole arms extending either side of the grounded strip line, the first front surface dipole arm and first rear surface dipole arm together forming a first dipole on one side of the feed, and the second front surface dipole arm and second rear surface dipole arm together forming a second dipole on the other side of the feed.

12. The antenna device as claimed in claim 11, wherein the first front surface dipole arm is connected to the feed line by a first switchable diode, and wherein the second front surface dipole arm is connected to the feed line by a second switchable diode.

13. The antenna device as claimed in claim 12, wherein the first and second switchable diodes are operable to allow the first dipole and the second dipole to be energised together or separately.

14. A compound antenna comprising a plurality of antenna devices as claimed in claim 1.

15. The compound antenna as claimed in claim 14, wherein the plurality of antenna devices are disposed to face in different directions.

16. The compound antenna as claimed in claim 14, wherein the plurality of antenna devices are disposed to face in the same direction.

17. The antenna device as claimed in claim 5, wherein the fast switching micro-actuator is a member selected from the group consisting of a solenoid actuator, an electroactive polymer actuator, a microelectromechanical systems actuator, a magnetic drive actuator and a micromotor.

18. A leaky-wave antenna device comprising:

a metasurface comprising a periodic array of conductive elements, or a periodic array of apertures in a conductive layer;

a conductive ground plane;

a micro-actuator; and a feed comprising a pair of switchable dipoles;

wherein the metasurface and the conductive ground plane are in a stacked arrangement and substantially parallel to one another;

wherein a spacing between the conductive ground plane and the metasurface is adjustable by operation of the micro-actuator; and wherein the feed is disposed on the conductive ground plane or between the conductive ground plane and the metasurface, at a location corresponding to a centre of the periodic array.

* * * * *